(12) United States Patent
Okada (10) Patent No.: US 9,100,103 B2
(45) Date of Patent: Aug. 4, 2015

(54) MULTI-HOP COMMUNICATION SYSTEM, AND SLAVE UNIT

(71) Applicant: Panasonic Corporation, Osaka (JP)

(72) Inventor: Yukio Okada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/383,233

(22) PCT Filed: Mar. 7, 2013

(86) PCT No.: PCT/JP2013/001431
§ 371 (c)(1),
(2) Date: Sep. 5, 2014

(87) PCT Pub. No.: WO2013/132856
PCT Pub. Date: Sep. 12, 2013

(65) Prior Publication Data
US 2015/0043661 A1    Feb. 12, 2015

(30) Foreign Application Priority Data

Mar. 9, 2012 (JP) ................................. 2012-053533

(51) Int. Cl.
*H04J 3/24* (2006.01)
*H04B 3/54* (2006.01)
(Continued)

(52) U.S. Cl.
CPC ............... *H04B 3/542* (2013.01); *H04W 28/06* (2013.01); *H04B 2203/5408* (2013.01); *H04B 2203/5416* (2013.01); *H04B 2203/5425* (2013.01);
(Continued)

(58) Field of Classification Search
None
See application file for complete search history.

(56) References Cited

U.S. PATENT DOCUMENTS

2002/0101849 A1* 8/2002 Kang et al. .................... 370/349
2004/0077352 A1* 4/2004 Mahany ........................ 455/448
(Continued)

FOREIGN PATENT DOCUMENTS

| JP | 2008-533806 A | 8/2008 |
|---|---|---|
| JP | 2008-219599 A | 9/2008 |

(Continued)

OTHER PUBLICATIONS

International Search Report for corresponding International Application No. PCT/JP2013/001431 mailed May 7, 2013.
(Continued)

*Primary Examiner* — Leon-Viet Nguyen
(74) *Attorney, Agent, or Firm* — Renner, Otto, Boisselle & Sklar, LLP.

(57) ABSTRACT

A master unit and a plurality of slave units perform a multi-hop communication. The plurality of slave units include hybrid slave units are configured to select at least one of wireless communication and power line carrier communication. One hybrid slave unit includes a function of reporting, to the other hybrid slave unit in which a hop number in the power line carrier communication between the one hybrid slave unit and the other hybrid slave unit is one, the minimum route cost when the wireless communication is used for a channel on an upper side. The one hybrid slave unit includes a function of adopting the power line carrier communication when a route cost reported by the other hybrid slave unit is smaller than the minimum route cost of the one hybrid slave unit, and otherwise adopting the wireless communication.

19 Claims, 5 Drawing Sheets (51) Int. Cl.
*H04W 28/06* (2009.01)
*H04L 12/801* (2013.01)

(52) U.S. Cl.
CPC . *H04B2203/5441* (2013.01); *H04B 2203/5495* (2013.01); *H04L 47/10* (2013.01)

(56) References Cited

U.S. PATENT DOCUMENTS

2008/0232258 A1  9/2008  Larsson et al.
2011/0085442 A1*  4/2011  Lin et al. ............... 370/235

FOREIGN PATENT DOCUMENTS

JP   2011-171994 A   9/2011
JP   2011-250301 A   12/2011

OTHER PUBLICATIONS

Form PCT/ISA/237 for corresponding International Application No. PCT/JP2013/001431 mailed May 7, 2013.
Ken-ichi Takanashi et al., "A Study for AODV Routing on Ad hoc Network Consisting of Wired and Wireless Links", Information Processing Society of Japan, IPSJ SIG Technical Reports, Sep. 17, 2014, vol. 2004, No. 95, pp. 55-62 with English translation.

* cited by examiner

| ADJACENT NODE IDENTIFICATION INFORMATION | HOP NUMBER | FIRST HOP NODE | SECOND HOP NODE | ... | n HOP NODE | UPPER ROUTE COST | LINK COST | ROUTE COST |
|---|---|---|---|---|---|---|---|---|
| MASTER UNIT | 0 | | | | | | 9 | 9 |
| N1 | 1 | N1 | | | | 5 | 7 | 12 |
| N3 | 2 | N2 | N3 | | | 15 | 8 | 23 |
| | | | | | | | | |

FIG. 4B

| ADJACENT NODE IDENTIFICATION INFORMATION | HOP NUMBER | FIRST HOP NODE | SECOND HOP NODE | ... | n HOP NODE | UPPER ROUTE COST | LINK COST | ROUTE COST |
|---|---|---|---|---|---|---|---|---|
| N12 | 2 | N1 | N12 | | | 15 | | |
| N14 | 2 | N2 | N14 | | | 17 | | |
| | | | | | | | | |

FIG. 5A

| OPERATION CODE | TRANSMISSION SOURCE IDENTIFICATION INFORMATION | SEQUENCE NUMBER | KIND OF NODE | ROUTE COST |
|---|---|---|---|---|

FIG. 5B

| OPERATION CODE | TRANSMISSION SOURCE IDENTIFICATION INFORMATION | SEQUENCE NUMBER | KIND OF NODE | NUMBER OF LINKS |
|---|---|---|---|---|

FIG. 5C

| OPERATION CODE | TRANSMISSION SOURCE IDENTIFICATION INFORMATION | SEQUENCE NUMBER | KIND OF NODE | ADJACENT NODE IDENTIFICATION INFORMATION 1 | ··· | ADJACENT NODE IDENTIFICATION INFORMATION n |
|---|---|---|---|---|---|---|

| ADJACENT NODE IDENTIFICATION INFORMATION | HOP NUMBER | UPPER ROUTE COST | LINK COST | ROUTE COST | NUMBER OF LINKS |
|---|---|---|---|---|---|
| N11 | 2 | | | | 2 |
| N13 | 2 | | | | 3 |
| N21 | — | | | | 2 |
| N22 | — | | | | 1 |
| | | | | | |

| ADJACENT NODE IDENTIFICATION INFORMATION | HOP NUMBER | UPPER ROUTE COST | LINK COST | ROUTE COST | ADJACENT NODE 1 | ADJACENT NODE 2 | ADJACENT NODE 3 | ADJACENT NODE 4 | ... | ADJACENT NODE n |
|---|---|---|---|---|---|---|---|---|---|---|
| N12 | 2 | | | | N11 | N13 | N22 | N23 | | |
| N21 | — | | | | N11 | — | — | — | | |
| N22 | — | | | | N11 | N12 | | | | |
| | | | | | | | | | | |

| ADJACENT NODE IDENTIFICATION INFORMATION | HOP NUMBER | FIRST HOP NODE | SECOND HOP NODE | ... | n HOP NODE | UPPER ROUTE COST | LINK COST | ROUTE COST |
|---|---|---|---|---|---|---|---|---|
| N11 | 2 | N1 | N11 | | | 11 | 32 | |
| N13 | 1 | N13 | | | | 9 | 41 | |
| N21 | — | | | | | | | |
| N22 | — | | | | | | | |
| | | | | | | | | |

MULTI-HOP COMMUNICATION SYSTEM, AND SLAVE UNIT

TECHNICAL FIELD

The present invention relates to a multi-hop communication system, and a slave unit.

BACKGROUND ART

Conventionally, there has been known a multi-hop communication that is used in a communication network including a plurality of nodes. When information is transmitted between nodes, the multi-hop communication permits the relay of communication by at least one of the other nodes. As an aspect of the multi-hop communication, there has been also known a communication network in which one node as a master unit communicates to the other nodes as slave units instead of all nodes having equal relationship. For example, in order to perform remote meter reading, JP 2011-250301 A (hereinafter referred to as "document 1") discloses a communication network that includes: a plurality of slave units (a plurality of slave stations) configured to respectively acquire meter reading results of consumers facilities; and a master unit (a master station) configured to collect the meter reading results from the plurality of slave units. In the technique described in document 1, when information of a meter reading result is transmitted to the master unit from any of the slave units, the relay by at least one of the other slave units is permitted, and the communication network that performs the multi-hop communication is constituted.

Incidentally, document 1 discloses that each slave unit is available both wireless communication and power line carrier communication, and forms a channel between the slave unit and the master unit by the wireless communication when failing to communicate by the power line carrier communication. That is, because the channel of the wireless communication is used as backup of the channel of the power line carrier communication, and it is not considered to properly distribute and use the channel of the power line carrier communication and the channel of the wireless communication.

DISCLOSURE OF INVENTION

The object of the present invention is to provide a multi-hop communication system, which, when performing multi-hop communication between a master unit and a plurality of slave units, distributes properly channels having communication methods different from each other, such as a channel of power line carrier communication and a channel of wireless communication, according to routes formed between the master unit and the slave units, and then has high reliability of communication while reducing signal interference and packet collision. Further, the object of the present invention is to provide a slave unit used for this multi-hop communication system.

To achieve the above objects, the multi-hop communication system according to the present invention includes a master unit and a plurality of slave units. The multi-hop communication system is configured to permit, when information is transmitted between the master unit and a slave unit of the plurality of slave units, another slave unit of the plurality of slave units to relay communication. The plurality of slave units includes at least one hybrid slave unit. The at least one hybrid slave unit is configured to select at least one of a plurality of communication methods that have arrival ranges of information different from each other.

In the multi-hop communication system, preferably, the hybrid slave unit is configured to select at least one of a first communication method and a second communication method as the plurality of communication methods. The first communication method is wireless communication by a radio wave as a transmission medium. The second communication method is power line carrier communication by a power line as a transmission medium.

In the multi-hop communication system, preferably, at least one hybrid slave unit includes a plurality of hybrid slave units. Each of the plurality of hybrid slave units includes a selection processing part in which a selection criterion is predetermined. The selection processing part, which is included in one hybrid slave unit of the plurality of hybrid slave units, is configured to select, in the case of selecting a communication method for a channel on an upper side that is a side of the master unit, the first communication method only when relationship with an other hybrid slave unit of the plurality of hybrid slave units, in which a hop number in power line carrier communication between the one hybrid slave unit and the other hybrid slave unit is one, meets the selection criterion, and otherwise select the second communication method.

That is, in the multi-hop communication, preferably, the plurality of slave units includes a first hybrid slave unit and a second hybrid slave unit, in which a hop number in power line carrier communication between the first hybrid slave unit and the second hybrid slave unit is one. Each of the plurality of hybrid slave units includes a selection processing part in which a selection criterion is predetermined. The first hybrid slave unit is configured to select, in the case of selecting a communication method for a channel on an upper side that is a side of the master unit, the first communication method only when relationship with the second hybrid slave unit meets the selection criterion, and otherwise select the second communication method.

In the multi-hop communication system, preferably, the selection processing part includes a function for reporting the minimum route cost in the case of using the first communication method for the channel on the upper side, to the other hybrid slave unit in which the hop number in the power line carrier communication between the one hybrid slave unit and the other hybrid slave unit is one. The selection processing part includes a function for adopting the second communication method for the channel on the upper side when a route cost reported by the other hybrid slave unit is smaller than the minimum route cost of the one hybrid slave unit, and adopting the first communication method for the channel on the upper side when the route cost reported by the other hybrid slave unit is larger than the minimum route cost of the one hybrid slave unit.

That is, in the multi-hop communication system, preferably, the selection processing part includes a function for reporting, to the second hybrid slave unit, the minimum route cost in the case of using the first communication method for the channel on the upper side. The selection processing part includes a function for adopting the second communication method for the channel on the upper side when a route cost reported by the second hybrid slave unit is smaller than the minimum route cost of the first hybrid slave unit, and adopting the first communication method for the channel on the upper side when the route cost reported by the second hybrid slave unit is larger than the minimum route cost of the first hybrid slave unit.

In the multi-hop communication system, preferably, the selection processing part is configured to determine, as the route cost, a temporary route cost calculated using only receiving quality by wireless communication.

In the multi-hop communication system, preferably, the selection processing part includes a function for reporting, to the other hybrid slave unit in which the hop number in the power line carrier communication between the one hybrid slave unit and the other hybrid slave unit is one, a number of the other slave unit in which a hop number in power line carrier communication between the one hybrid slave unit and the other slave unit is one. The selection processing part includes a function for adopting the first communication method for the channel on the upper side when a number reported by the other hybrid slave unit is less than the number of the other slave unit reported to the other hybrid slave unit.

That is, in the multi-hop communication system, preferably, the selection processing part includes a function for reporting, to the second hybrid slave unit, a number of the other slave unit in which a hop number in power line carrier communication between the first hybrid slave unit and the other slave unit is one. The selection processing part includes a function for adopting the first communication method for the channel on the upper side when a number reported by the second hybrid slave unit is less than the number of the other slave unit reported to the second hybrid slave unit.

In the multi-hop communication system, preferably, the selection processing part includes a function for adopting the first communication method for the channel on the upper side when a slave unit of other slave units, in which hop numbers in power line carrier communication between the one hybrid slave unit and the other slave units are one, performs power line carrier communication with only the one hybrid slave unit.

That is, in the multi-hop communication system, preferably, the selection processing part includes a function for adopting the first communication method for the channel on the upper side when a slave unit of other slave units, in which hop numbers in power line carrier communication between the first hybrid slave units and the other slave units are one, performs power line carrier communication with only the first hybrid slave unit.

In the multi-hop communication system, preferably, the selection processing part includes a function for determining, as a first route cost, the minimum route cost when the first communication method is used for the channel on the upper side, and determining, as a second route cost, a route cost of passing through the other slave unit in which a hop number in power line carrier communication between the one hybrid slave unit and the other slave unit is one, and adopting the first communication method for the channel on the upper side when a difference obtained by subtracting the first route cost from the second route cost exceeds a specified threshold.

That is, in the multi-hop communication system, preferably, the selection processing part includes a function for determining, as a first route cost, the minimum route cost when the first communication method is used for the channel on the upper side, and determining, as a second route cost, a route cost of passing through a slave unit in which a hop number in power line carrier communication between the first hybrid slave unit and the other slave unit is one, and adopting the first communication method for the channel on the upper side when a difference obtained by subtracting the first route cost from the second route cost exceeds a specified threshold.

In the multi-hop communication system, preferably, the selection processing part includes a function for performing weighting to the selection criterion so that the first communication method is preferentially selected when the first communication method has been already adopted for the channel on the upper side, and wireless communication is preferentially used in the other hybrid slave unit when the other hybrid slave unit in which the hop number in the power line carrier communication between the one hybrid slave unit and the other hybrid slave unit is one, has been already selected wireless communication in a channel on an upper side.

That is, in the multi-hop communication system, preferably, the selection processing part includes a function for performing weighting to the selection criterion so that the first communication method is preferentially selected when the first communication method has been already adopted for the channel on the upper side, and wireless communication is preferentially used in the second hybrid slave unit when the second hybrid slave unit has been already selected wireless communication in a channel on an upper side.

In the multi-hop communication system, preferably, the one hybrid slave unit includes a function for communicating with the other apparatus. The selection processing part is configured to set so that a probability that different communication methods are selected is higher than a probability that same communication methods are selected when selecting a communication method for communication between the one hybrid slave unit and the other slave unit in which a hop number in power line carrier communication between the one hybrid slave unit and the other slave unit is one, and a communication method for communication between the other apparatus and the one hybrid slave unit.

That is, in the multi-hop communication system, preferably, the first hybrid slave unit includes a function for communicating with an apparatus disposed in the same consumer facility as the first hybrid slave unit. The selection processing part is configured to set so that a probability that different communication methods are selected is higher than a probability that same communication methods are selected when selecting a communication method for communication between the first hybrid slave unit and a slave unit in which a hop number in power line carrier communication between the first hybrid slave unit and the other slave unit is one, and a communication method for communication between the apparatus and the first hybrid slave unit.

A slave unit according to the present invention is used, as any one of the plurality of slave units, for the multi-hop communication system.

The second hybrid slave unit has the same function as the first hybrid function.

According to the configuration of the present invention, there is an advantage in that, when the multi-hop communication is performed between the master unit and each of the plurality of slave unit, channels of different communication methods, such as the channel of the power line carrier communication and the channel of the wireless communication, can be properly distributed according to the route formed between the master unit and each of the slave units.

BRIEF DESCRIPTION OF DRAWINGS

Preferred embodiments of the present invention will now be described in further details. Other features and advantages of the present invention will become better understood with regard to the following detailed description and accompanying drawings where.

DESCRIPTION OF EMBODIMENTS

In an embodiment described below, the following case is assumed: a plurality of slave units are respectively installed to electric power meters in electric consumer's facilities, and one master unit communicates with the plurality of slave units in order to collect meter reading data that the plurality of slave units acquired from the electric power meters, respectively. A function of each slave unit is not limited to collection of the meter reading data. When electrical apparatuses that a consumer uses include prescribed communication functions, the slave unit is also capable of including a function for managing electrical energy by communicating with these electrical apparatuses.

The master unit is assumed as a management server that is managed by an electric power company or a service provision company entrusted from the electric power company. The managing server does not mean to be constituted of only one computer. The managing server may be constituted of two or more computers. The master unit may constitute a communication network hierarchized by multiple layers. For example, the master may be an upper communication network that includes a plurality of relay devices configured to communicate with the managing server. In this case, a lower communication network may be constituted, in which a relay device communicates with the slave unit for each relay device that is part of the master unit.

The embodiment described below is not restricted to the use of management of electric power. That is, the embodiment described below is a communication network in which the master unit communicates with the plurality of slave units and is applicable in the case where multi-hop communication is performed, in which a slave unit that transmits information to the master unit permits the other slave unit to relay the information. In the embodiment described below, a specific example of use is not described in detail. A function for constituting the communication network between the master unit and the slave units will be mainly described.

Figure 2:
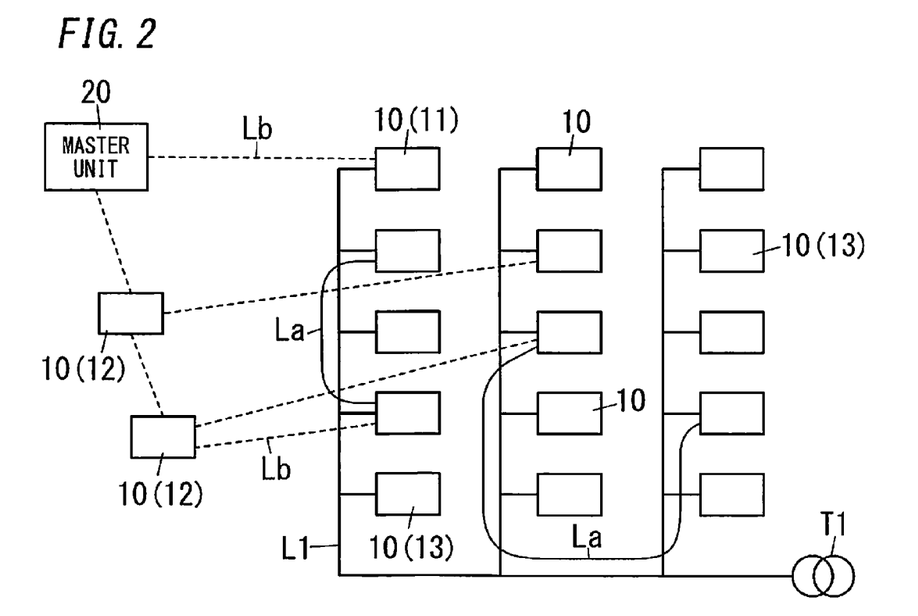
FIG. 2 is a drawing illustrating a specific example of the communication network according to the embodiment.

As described above, each slave unit is configured to acquire meter reading data from the electric power meter of the consumer and transmit the meter reading data to the master unit. FIG. 2 shows an example of the communication network (a multi-hop communication system). The communication network shown in FIG. 2 includes one master unit 20 and a plurality of slave units 10. Each slave unit 10 is configured to communicate with an apparatus that has a communication function, of apparatuses used by a consumer. Therefore, each slave unit 10 is capable of managing (managing and setting) operation of the apparatus. The apparatuses are disposed in the same consumer's facility with the slave unit 10.

On the other hand, the slave unit 10 that permits the other slave unit 10 to relay between the master unit 20 and the slave unit 10 includes at least one of a function for performing wireless communication by a radio wave as a transmission medium and a function for performing power line carrier communication by a power line as a transmission medium.

That is, the slave units 10 are classified into three configurations: a configuration to perform both wireless communication and power line carrier communication; a configuration to perform only wireless communication; and a configuration to perform only power line carrier communication. Hereinafter, a slave unit 10 configured to perform both the wireless communication and the power line carrier communication is called a "hybrid slave unit 11", a slave unit 10 configured to perform only the wireless communication is called a "wireless slave unit 12", and a slave unit 10 configure to perform only the power line carrier communication is called a "wired slave unit 13". In FIG. 2, solid lines show channels La of the power line carrier communication, and dashed lines show channels Lb of the wireless communication.

The hybrid slave unit 11 may be configured to select, as communication methods, frequency bands and modulation methods in which arrival ranges or signal interference ranges of information are different from each other even in the same wireless communication in addition to be configured to select at least one of communication methods in which physical layers are different from each other, such as the wireless communication (a first communication method) and the power line carrier communication (a second communication method). In any case, arrival ranges or signal interference ranges of information should be different from each other by selecting of different communication methods. That is, the hybrid slave unit 11 is configured to select at least one of a plurality of communication methods that have arrival ranges of information different from each other. For example, the hybrid slave unit 11 is configured to select at least one of the first communication method and the second communication method as the plurality of communication methods.

In a configuration example shown in FIG. 2, it is assumed that the following cases is mixed: a plurality of consumers that share one building such as a collective housing or a tenant building; and a consumer that occupies one building such as a detached housing. That is, a plurality of slave units (15 slaves units) 10 connected to a power line L1 in a right part of FIG. 2 correspond to the former, and a plurality of slave units (two slave units) 10 that are independently disposed in a left part of FIG. 2 correspond to the latter.

The power line L1 is connected to a secondary side of a step-down transformer T1, and the hybrid slave units 11 and the wired slave units 13 are connected to the power line L1. The power line carrier communication with the power line L1 as a transmission medium is fundamentally performed between the plurality of slave units 10 connected to the power line L1. Among the plurality of slave units 10 connected to the power line L1, when communication quality is deteriorated, the wireless communication is permitted. Although FIG. 2 shows the plurality of slave units 10 including the wired slave units 13 for a description, all the slave units 10 connected to the power line L1 may be the hybrid slave units 11.

On the other hand, two slave units 10 shown in the left part of FIG. 2 are the wireless slave units 12 and do not perform the power line carrier communication. However, even if a consumer occupies one building such as a detached housing, when communicating with the relay device described above using a power line connected to a secondary side of a step-down transformer, the slave units 10 may be replaced with the hybrid slave units 11 or the wired slave units 13.

Figure 3:
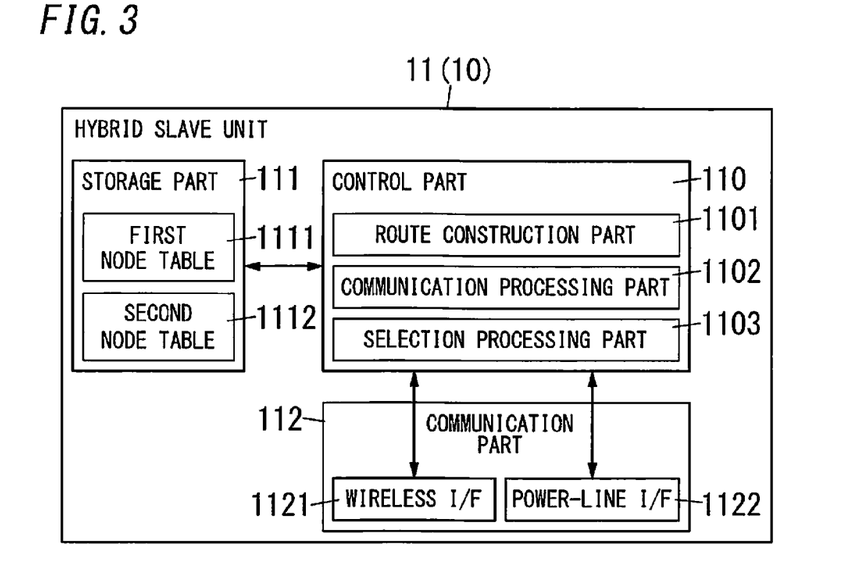
FIG. 3 is a block diagram illustrating a slave unit used to the embodiment.

FIG. 3 shows a configuration example of the hybrid slave unit 11. Fundamentally, the hybrid slave unit 11 includes a control part 110, a storage part 111, and a communication part 112.

The control part 110 includes, as a main hardware element, a device that operates according to a program, such as a microcomputer. The control part 110 includes a route construction part 1101, a communication processing part 1102, and a selection processing part 1103. The route construction part 1101 is configured to perform processing for constructing a communication route. The communication processing part 1102 is configured to communicate using the constructed communication route. The selection processing part 1103 is configured to select which the power line carrier communication or the wireless communication is performed.

The storage part 111 is configured to store a program for operating the control part 110. The storage part 111 includes at least a first node table 1111 and a second node table 1112. Although the storage part 111 is desirable to be another device different from the control part 110, the storage part 111 may be constituted integrally with the control part 110.

The communication part 112 includes a wireless-communication interface part 1121 and a power-line-carrier-communication interface part 1122. The wireless-communication interface part 1121 is configured to transmit and receive a radio wave in order to perform the wireless communication. The power-line-carrier-communication interface part 1122 is connected to the power line L1 (refer to FIG. 2) in order to perform the power line carrier communication. Hereinafter, a "wireless-communication interface part" is abbreviated to a "wireless I/F", and a "power-line-carrier-communication interface part" is abbreviated to a "power-line I/F". In the hybrid slave unit 11, the selection processing part 1103 of the control part 110 is configured to determine which the wireless I/F 1121 or the power-line I/F 1122 is used based on the construction result of the route by the route construction part 1101.

The wireless slave unit 12 has a configuration in which the selection processing part 1103 and the power-line I/F 1122 are omitted from the hybrid slave unit 11. The wired slave unit 13 has a configuration in which the selection processing part 1103 and the wireless I/F 1121 are omitted from the hybrid slave unit 11. Actually, with the hybrid slave unit 11 and the wireless slave unit 12, or with the hybrid slave unit 11 and the wired slave unit 13, although the configurations of the storage parts 111 thereof are also different from each other, hardware organizations thereof are the substantially same configurations.

Incidentally, the communication network (referred to FIG. 1), which is constituted of the plurality of slave units 10 and the master unit 20, performs the multi-hop communication in which a slave unit 10 transmitting information to the master unit 20 permits the other slave unit 10 to relay the information. Therefore, the communication network must select which slave unit 10 is used for the relay. For this reason, each slave unit 10 beforehand searches for and stores a route (path) that has high communication quality, and then communicates with the master unit 20 using the route for which the each slave unit 10 searched beforehand and has the high communication quality. When failing to transmit the information to the master unit 20, the slave unit 10 resends the information by the same route, or resends the information by selecting a route that has second highest communication quality. Since such a technique is well-known, a description thereof is omitted.

The following will describe the procedure of searching for the route described above by the route construction part 1101. That is, the following will describe the procedure of searching for the route for communicating with the master unit 20 for each of the slave units 10. Here, when another node is not included in the route between the nodes (general term of the slave unit 10 and the master unit 20) that transmit information, a channel formed between the nodes is called a "link". An evaluation value of communication quality of the link is called a "link cost". A link cost in the whole route between the nodes that transmit information is called a "route cost". That is, the route cost is a total of link costs in all links included in a route. The link cost is an integral value calculated using SNR, signal strength, and the like for each of the links. The link cost is calculated so as to become smaller value as the communication quality is higher. The number of links that constitutes a route is called the "hop number". Therefore, in the case where communication is performed directly without the other slave unit 10, the hop number is one. When the hop number between two nodes is one, to one node, the other node is called an "adjacent node". For example, when the hop number of a second hybrid slave unit 11 in the power line carrier communication between a first hybrid slave unit 11 and the second hybrid slave unit 11 is one, the second hybrid slave unit 11 is called the "adjacent node" to the first hybrid slave unit 11.

In the case where wireless communication between two nodes is performed, when receiving sensitivities or radio-wave-interference situations of nodes are different from each other, a difference may arise in link costs depending on directions of transmission and reception. Therefore, in order to determine the link cost correctly, it is required to bidirectionally communicate between two nodes. However, in a communication network including plural nodes, when each node bidirectionally performs wireless communication with all the adjacent nodes, acquisition of the link cost takes a lot of time.

In order to solve this, each slave unit 10 of the present embodiment permits to calculate a temporary link cost using only receiving quality of a radio signal and determine a temporary route cost from the temporary link cost. Since the temporary link cost is calculated using only the receiving quality, the temporary link cost can be calculated by only receiving a Hello packet described later, and the temporary route cost can be also calculated by only receiving the Hello packet. Therefore, the time for acquisition of the link cost and the route cost is shortened, and it is possible to prevent traffic from increasing.

The following will describe by assuming the case where each slave unit 10 calculated the link cost and the route cost after searching for the adjacent node. The hybrid slave unit 11 is capable of selecting the channel of wireless communication and the channel of power line carrier communication. Therefore, when transmitting information to the adjacent node, the route construction part 1101 needs to select which the wireless I/F 1121 or the power-line I/F 1122 is used. The selection of the wireless I/F 1121 or the power-line I/F 1122 is performed using data included in a first node table (a first link table) 1111 shown in FIG. 4A and a second node table (a second link table) 1112 shown in FIG. 4B.

Figure 1:
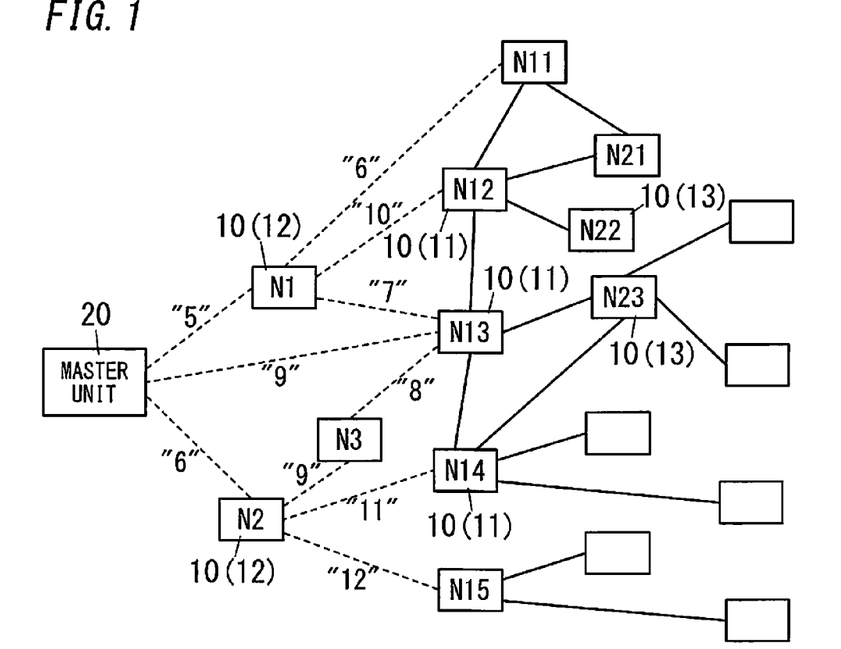
FIG. 1 is a drawing illustrating an example of a communication network according to an embodiment.

Hereinafter, the case where the communication network shown in FIG. 1 is constituted will be described as an example. Quadrangles in FIG. 1 express the nodes, and solid lines and dashed lines that connect nodes express links. In the links, the solid lines express links in which power line carrier communication is performed, and the dashed lines express links in which wireless communication is performed. Numerical values in the quadrangles showing the nodes are identification information of the nodes, and numerical values enclosed in double quote near the links are link costs.

The route construction part 1101 is configured to perform preprocessing for constituting the communication network as shown in FIG. 1 before performing main processing for calculating the route cost to determine the route. That is, the route construction part 1101 is configured to perform, as the preprocessing, processing for determining which the power line carrier communication or the wireless communication is used for each link by using the first node table 1111 shown in FIG. 4A and the second node table 1112 shown in FIG. 4B.

Figure 4A:
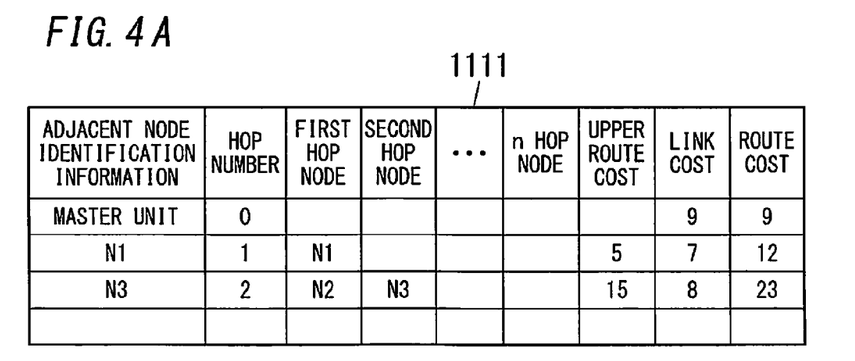
FIG. 4A is a drawing illustrating an example of a first link table used to the embodiment.
Figure 4B:
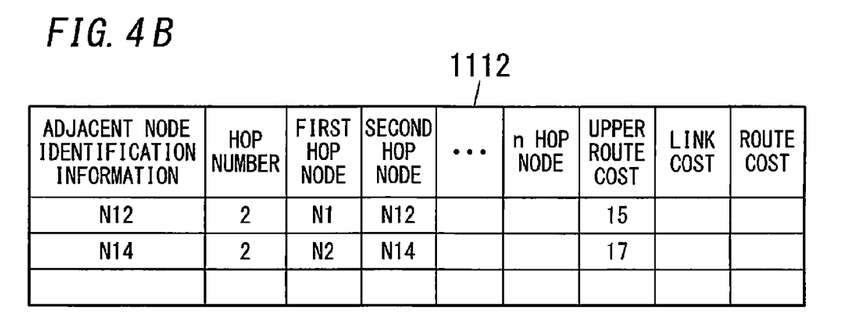
FIG. 4B is a drawing illustrating an example of a second link table used to the embodiment.

The first node table 1111 and the second node table 1112 manage information about the route of passing through the adjacent node between the master unit 20 and a focused hybrid slave unit 11 for each adjacent node of the focused hybrid slave unit 11. Specifically, the node tables 1111 and 1112 include identification information of the adjacent nodes of the focused hybrid slave unit 11, the hop number of the route between the master unit 20 and the adjacent node, and identification information of the slave unit 10 included in the route and order of relay on the route about the slave unit 10. Further, the node tables 1111 and 1112 include, for each adjacent node, a route cost (referred to as an "upper route cost") between the master unit 20 and the adjacent node, a link cost between the adjacent node and the focused hybrid slave unit 11, and the whole route cost between the master unit 20 and the focused hybrid slave unit 11. The sum of the upper route cost and the link cost agrees with the whole route cost.

According to the kind of the link between the focused hybrid slave unit 11 and the adjacent node, the information about the route is distributed to the first node table 1111 and the second node table 1112 to be managed. That is, information of an adjacent node connected to the focused hybrid slave unit 11 by the link in which the wireless communication is performed is stored in the first node table 1111. Information of an adjacent node connected to the focused hybrid slave unit 11 by the link in which the power line carrier communication is performed is stored in the second node table 1112.

If the slave unit 10 whose identification information is "N13" is the focused hybrid slave unit 11, the slave units 10 whose identification information are "N1", "N3", "N12", "N14", and "N23" become the adjacent nodes of this focused hybrid slave unit 11. Here, the slave units 10 whose identification information are "N1" and "N3" are the wireless slave units 12, the slave units 10 whose identification information are "N12" and "N14" are the hybrid slave units 11, and the slave unit 10 whose identification information is "N23" is the wired slave unit 13. Hereinafter, the slave unit 10 whose identification information is "Nn" is called a slave unit 10 of "Nn".

Since the communication network shown in FIG. 1 is assumed, the adjacent nodes registered into the first node table 1111 about the hybrid slave unit 11 of "N13" become the master unit 20 and the slave units 10 of "N1", "N3", "N12", and "N14". Among these, when the slave unit 10 of "N3" is focused, the slave unit 10 of "N2" is on the route of passing through the slave unit 10 of "N3" between the master unit 20 and the hybrid slave unit 11 of "N13". A first node from the master unit 20 is the slave unit 10 of "N2", and a second node from the master unit 20 is the slave unit 10 of "N3". The hop number of the slave unit 10 of "N3", which is the adjacent unit, from the master unit 20 is two, and an upper route cost is 15 (=6+9). The link cost between the hybrid slave unit 11 of "N13" and the slave unit 10 of "N3" is eight. Therefore, the whole route cost is 23 (=15+8). Similarly, data is also registered about the other adjacent nodes.

On the other hand, the adjacent nodes registered into the second node table 1112 corresponding to the hybrid slave unit 11 of "N13" is an adjacent node connected to the hybrid slave unit 11 of "N13" by the link in which the power line carrier communication with the hybrid slave unit 11 of "N13" is performed. Therefore, these adjacent nodes are the slave units 10 of "N12", "N14", and "N23". When the slave unit 10 of "N14" is focused, the slave unit 10 of "N2" is on the route of passing through the slave unit 10 of "N14" between the master unit 20 and the hybrid slave unit 11 of "N13". A first node from the master unit 20 is the slave unit 10 of "N2", and a second node from the master unit 20 is the slave unit 10 of "N14". The hop number of the slave unit 10 of "N14", which is the adjacent unit, from the master unit 20 is two, and an upper route cost is 17 (=6+11). Similarly, data is also registered about the other adjacent nodes.

When the data is registered into the first node table 1111 and the second node table 1112, the selection processing part 1103 is configured to compare the minimum route cost in the first node table 1111 with the minimum upper route cost in the second node table 1112. When the minimum route cost in the first node table 1111 is smaller than the minimum upper route cost in the second node table 1112, the whole route cost of the route selected from the first node table 1111 is smaller than that of the route selected from the second node table 1112.

That is, when the relation described above is established, the route cost of the route, on which the adjacent node selected from the second node table 1112 is disposed, is not made to be smaller than that of the route of passing through the adjacent node that minimizes the route cost in the first node table 1111. Therefore, in the focused hybrid slave unit 11, it is more desirable to select the channel of the wireless communication in the route between the focused hybrid slave unit 11 and the master unit 20.

In order to perform operation described above, the selection processing part 1103 is configured to report the minimum route cost in the first node table 1111 to the wired slave unit 13 and the hybrid slave unit 11 included in the adjacent nodes. When reporting the route cost, the adjacent node through the power-line I/F 1122, the selection processing part 1103 uses the Hello packet (hereinafter, referred to as an "H packet") that shows that the node is operating in the multi-hop communication. The H packet is sent from each node by broadcasting, and the node that sent the H packet reports to the other node that the node that sent the H packet exists in the communication network.

Figure 5A:
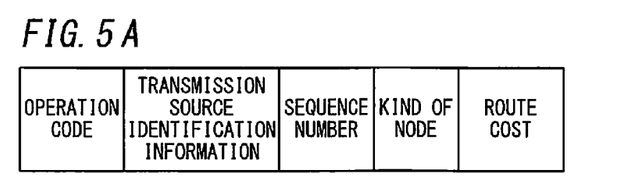
FIG. 5A is a drawing illustrating an example of a format of a Hello packet used to the embodiment.

Therefore, as shown in FIG. 5A, fundamentally, the H packet should include an operation code, identification information of the node that is a transmission source ("transmission source identification information" in FIG. 5A), a sequence number, and the kind of the node that is a transmission destination. As described above, since the route cost when the wireless I/F 1121 is used is required to be reported to other nodes by the H packet, the H packet further includes the route cost except for the case where the node participates in the communication network.

The operation code is an identification that indicates the kind of a packet. The plural kinds of packets are used in the present embodiment. Examples of the plural kinds of packets include a response packet that the node received the H packet returns if needed, and a packet for reporting communication quality in addition to the H packet. MAC Address of the node and the like in addition to the identification information given uniquely may be also used as the identification information of the node of the transmission source. The sequence number is a number given to the packet given during the communication. The same sequence number is given to plural packets used for a series communications. Therefore, it is shown that the plural packets are related packets. The route cost is the minimum value of the route cost obtained from the first node table 1111.

When the hybrid slave unit 11 transmits the H packet, which includes the route cost, to the adjacent node through the power-line I/F 1122, the adjacent node received the H packet compares the route cost included in the H packet with the upper route cost stored in the second node table 1112. When the route cost received from the hybrid slave unit 11 is smaller than the upper route cost, the selection processing part 1103 of this adjacent node selects the wireless I/F 1121, that is, the wireless communication, in order to form the channel on an upper side (a side near the master unit 20). Even if selecting the wireless I/F 1121, the selection processing part 1103 of this adjacent node selects the power-line I/F 1122 on a lower side.

As described above, the selection processing part 1103 of the hybrid slave unit 11 selects, using the following procedures, which the wireless I/F 1121 or the power-line I/F 1122 is used. That is, first, the adjacent hybrid slave unit 11 transmits, to the focused hybrid slave unit 11, the H packet including the minimum route cost in the first node table 1111 using the power-line I/F 1122. Next, the selection processing part 1103 of the hybrid slave unit 11 (the focused hybrid slave unit) that received this H packet compares the route cost in the H packet with the minimum upper route cost in the second node table 1112. When the route cost is smaller than the upper route cost, the selection processing part 1103 selects the wireless I/F 1121 on the upper side, and selects the power-line I/F 1122 on the lower side. When the route cost is larger than the upper route cost, the selection processing part 1103 selects only the power-line I/F 1122.

When the selection processing part 1103 performs the processing described above, in the communication network shown in FIG. 1, each of the hybrid slave units 11 of "N11", "N12", and "N14" is used only the power-line I/F 1122. The hybrid slave unit 11 of "N13" adopts the wireless I/F 1121 on the upper side and the power-line I/F 1122 on the lower side. An operation of the hybrid slave unit 11 of "N15" is the same as that of the hybrid slave unit 11 of "N13". Therefore, it is possible to limit, to a small number, the number of the hybrid slave unit 11 connected to the upper side using the wireless I/F 1121 so that the quality of the route is high.

The selection processing part 1103 described above uses the route cost as the selection criterion for selecting which the wireless I/F 1121 or the power-line I/F 1122 is used on the upper side. However, another selection criterion may be used for determining a channel.

It is possible to use, for example, the number of the adjacent node that performs the power line carrier communication as a selection criterion of a channel. That is, in the hybrid slave unit 11 in which the number of the adjacent nodes that performs the power line carrier communication is large, a selection criterion may be set, in which the wireless I/F 1121 is used for the communication on the upper side.

Figure 6:
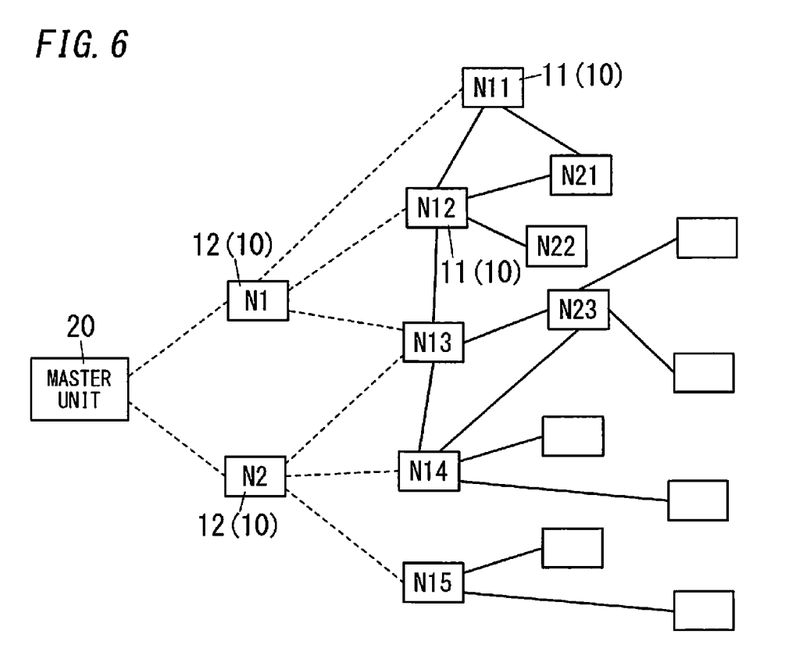
FIG. 6 is a drawing illustrating another example of the communication network according to the embodiment.

Hereinafter, an operation example is described using, as an example, a communication network shown in FIG. 6. In the communication network shown in FIG. 6, when the slave unit 10 of "N12" is the focused hybrid slave unit 11, the slave units 10 of "N11", "N13", "N21", and "N22" become the adjacent node that performs the power line carrier communication.

When the number of the adjacent nodes of the focused hybrid slave unit 11 is used as the selection criterion, the number of links in the case of communicating using the power-line I/F 1122 is required as an item of the second node table 1112 in the focused hybrid slave unit 11. Because this number of the links is the number of the adjacent node that use the power line carrier communication with the focused hybrid slave unit 11, the number of the links is sum of the number of the adjacent hybrid slave unit 11 and the number of the adjacent wired slave unit 13. That is, the number of the links is the sum of the number of the adjacent wired slave unit 13 and the number of the adjacent hybrid slave unit 11 performing the power line carrier communication with the focused hybrid slave unit 11.

Figure 7:
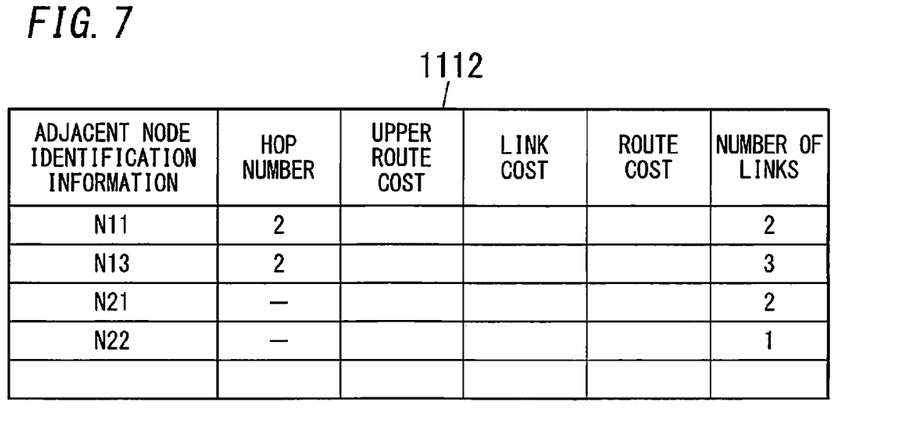
FIG. 7 is a drawing illustrating another example of the second link table used to the embodiment.

Therefore, the second node table (the second link table) 1112 in the hybrid slave unit 11 of "N12" includes contents shown in FIG. 7. In the illustrated example, identification information of the slave unit 10 on the route between the master unit 20 and the adjacent node and information as to order of relay on the route are omitted. However, the above-mentioned information may be included. The hop number in the second node table 1112 is the hop number by wireless communication between the master unit 20 and the adjacent node. Since it is assumed that two slave units 10 of "N21" and "N22" do not perform wireless communication, information as to the hop number is not included in the two slave units 10 of "N21" and "N22" of the illustrated example.

According to the second node table 1112 shown in FIG. 7, it turns out that the number of the adjacent node that performs power line carrier communication between the focused hybrid slave unit 11 (that is, the number of links) is "4". On the other hand, when the item of the number of links is referred, it turns out that the maximum number of links in the adjacent nodes is "3". Thus, the selection processing part 1103 of the hybrid slave unit 11 can obtain the number of the adjacent nodes (the number of links) and the number of links for each adjacent node by using the second node table 1112. In the case of this example, since the number of the links of the hybrid slave unit 11 of "N12" is more than the number of links of the adjacent node that perform the power line carrier communication between the hybrid slave unit 11 of "N12", the hybrid slave unit 11 of "N12" forms a channel on the upper side using the wireless I/F 1121.

Figure 5B:
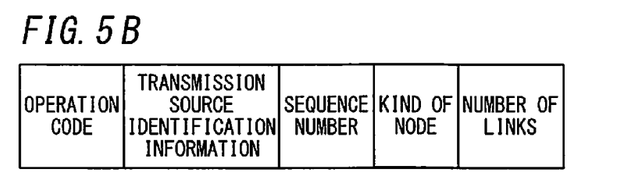
FIG. 5B is a drawing illustrating an example of a format of a Hello packet used to the embodiment.

When adopting the operation described above, the selection processing part 1103 of the hybrid slave unit 11 is configured to select, in the following procedures, which the wireless I/F 1121 or the power-line I/F 1122 is used. That is, the adjacent hybrid slave unit 11 transmits the H packet including the number of links obtained from information stored in the second node table 1112 to the focused hybrid slave unit 11 using the power-line I/F 1122. As shown in FIG. 5B, this H packet includes the number of links in addition to an operation code, identification information of a transmission source ("transmission source identification information" in FIG. 5B), a sequence number, and the kind of the node that is a transmission destination. Therefore, it enables the selection processing part 1103 of the hybrid slave unit 11 that received this H packet (the focused hybrid slave unit 11) can store the number of links included in the H packet in the item of the number of links of the second node table 1112.

When the second node table 1112 stores data in the items of the number of links of all the adjacent nodes, the selection processing part 1103 compares the maximum number of links in the second node table 1112 with the number of the adjacent nodes. When the number of the adjacent nodes is more than the maximum number of the links, the selection processing part 1103 selects the wireless I/F 1121 on the upper side, and selects the power-line I/F 1122 on the lower side. When the maximum number of the links is less than or equal to the number of the adjacent nodes, the selection processing part 1103 selects only the power-line I/F 1122. Therefore, it is possible to limit the number of the hybrid slave unit 11 that uses the wireless I/F 1121 on the upper side to necessary minimum.

Here, in above-mentioned operation, the hybrid slave unit 11 may report a list of the identification information of the adjacent nodes instead of reporting the number of the adjacent nodes with the H packet.

The selection criterion of the channel may be topology as to the adjacent node of the hybrid slave unit 11. That is, the selection processing part 1103 may select whether or not to form the channel on the upper side of the hybrid slave unit 11 using the wireless I/F 1121 according to whether the link on the upper side in the adjacent node is one or plural. When the link on the upper side in the adjacent node of the hybrid slave unit 11 is one, the adjacent node constitutes a route between the master unit 20 and the adjacent node through only this hybrid slave unit 11. In the case of such topology, the channel on the upper side of the hybrid slave unit 11 is formed by the wireless I/F 1121.

Figure 8:
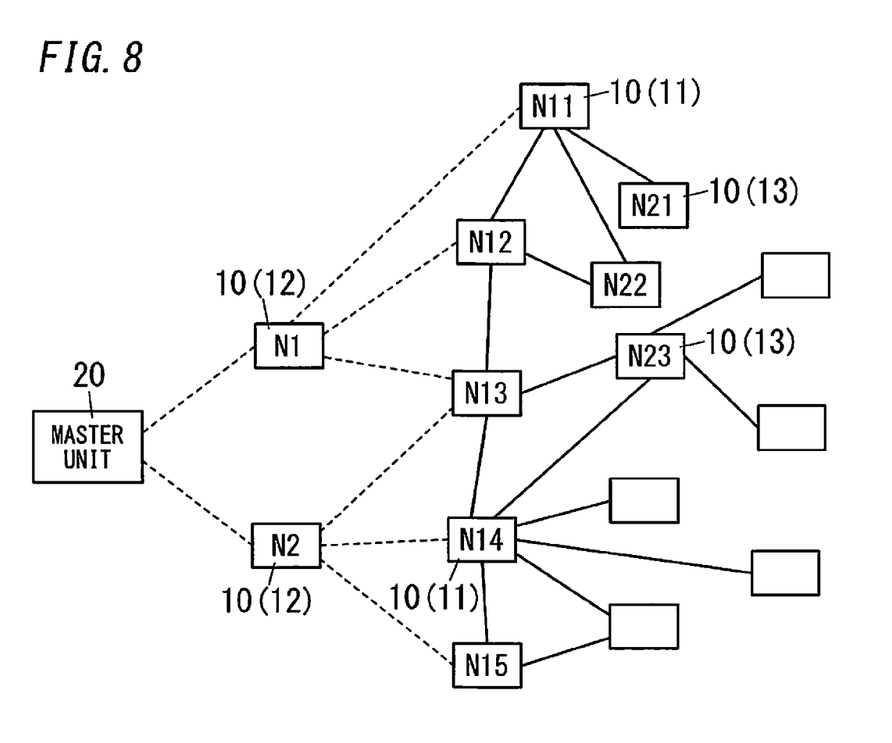
FIG. 8 is a drawing illustrating yet another example of the communication network according to the embodiment.

Hereinafter, an operation example will be described by using, as an example, a communication network shown in FIG. 8. In the communication network shown in FIG. 8, if the slave unit 10 of "N11" is the focused hybrid slave unit 11, the slave unit 10 of "N12", "N21", and "N22" become the adjacent nodes that perform power line carrier communication with the focused hybrid slave unit 11.

Figure 9:
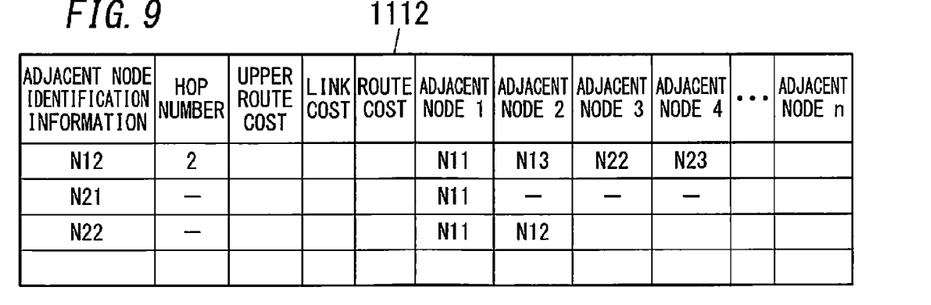
FIG. 9 is a drawing illustrating yet another example of the second link table used to the embodiment.

When topology as to the adjacent nodes is used for a selection criterion, identification information of the adjacent node for each adjacent node is required as an item of the second node table 1112 in the focused hybrid slave unit 11 (the hybrid slave unit 11 of "N11"). That is, in the communication network, it is necessary to obtain a link as to the slave unit 10 that is within the range of two hops from the focused hybrid slave unit 11. Therefore, as shown in FIG. 9, the second node table (the second link table) 1112 in the hybrid slave unit 11 of "N11" includes identification information of an adjacent node adjacent to the node of two hops from the focused hybrid slave unit 11. In the illustrated example, the identification information of the node on the route between the master unit 20 and the adjacent node and information about order of relay on the route are omitted. However, this information may be included.

According to the second node table 1112 shown in FIG. 9, each of the adjacent nodes that perform the power line carrier communication with the hybrid slave unit 11 of "N11" includes identification information of the next adjacent node. That is, the adjacent nodes of the hybrid slave unit 11 of "N11" are the slave units 10 of "N12", "N21", and "N22", and the adjacent nodes of the slave unit 10 of "N12" are the slave units 10 of "N11", "N13", and "N22". The adjacent node of the slave unit 10 of "N21" is only the slave unit 10 of "N11", and the adjacent nodes of the slave unit 10 of "N22" are the slave units 10 of "N11" and "N12".

Thus, the selection processing part 1103 of the focused hybrid slave unit 11 (the hybrid slave units 11 of "N11") can determine whether or not a slave unit 10 that forms a link on the upper side only between the hybrid slave unit 11 is included by using the second node table 1112. In the case of this example, since the adjacent node of the slave unit 10 of "N21" is only the hybrid slave unit 11 of "N11", the hybrid slave unit 11 of "N11" forms the channel on the upper side using the wireless I/F 1121.

Figure 5C:
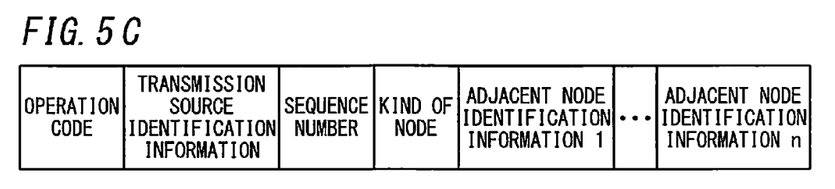
FIG. 5C is a drawing illustrating an example of a format of a Hello packet used to the embodiment.

When the operation described above is adopted, the selection processing part 1103 of the hybrid slave unit 11 selects, in the following procedures, which the wireless I/F 1121 or the power-line I/F 1122 is used. That is, first, the adjacent hybrid slave unit 11 transmits, to the focused hybrid slave unit 11, the H packet including the number of links obtained from the information stored in the second node table 1112 using the power-line I/F 1122. As shown in FIG. 5C, this H packet includes identification information of each of adjacent nodes in addition to an operation code, identification information of a transmission source, a sequence number, and the kind of the node that is a transmission destination. Therefore, it enables the selection processing part 1103 of the hybrid slave unit 11 (the focused hybrid slave unit 11) that received this H packet is capable of storing data in an item of identification information of further adjacent nodes adjacent to each of the adjacent nodes.

If data is stored, about all the adjacent nodes, in items of the identification information of the further adjacent nodes adjacent to each of adjacent nodes of the second node table 1112, the selection processing part 1103 determines presence or absence of the adjacent node of which the number of further adjacent nodes is one. When the adjacent node in which the number of further adjacent nodes is one is present, the selection processing part 1103 selects the wireless I/F 1121 on the upper side of the focused hybrid slave unit 11. Further, the selection processing part 1103 selects the power-line I/F 1122 on the lower side of the focused hybrid slave unit 11. In short, the selection processing part 1103 extracts, for each adjacent node of the focused hybrid slave unit 11, the further adjacent node adjacent to the adjacent node, and, when a condition that the number of further adjacent nodes is one are satisfied, selects the wireless I/F 1121 on the upper side of the focused hybrid slave unit 11. Therefore, the slave unit 10 connected to the lower side by power line carrier communication can generate the communication route having high quality while suppressing the number of the hybrid slave unit 11 that uses the wireless I/F 1121 on the upper side.

In the present embodiment, at least one kind of three kinds of selection criterion described above can be used to determine the channel in the hybrid slave unit 11. By adopting the selection criterion described above, the hybrid slave unit 11 selects power line carrier communication prior to wireless communication. For example, if the consumer facility is a collective housing, a tenant building, or the like, and power line carrier communication is used in a building, an arrival range of information is restricted in the building or the like. On the other hand, in the case of wireless communication, an arrival range is wide, and there is a possibility of giving signal interference broadly. Since the hybrid slave unit 11 connected to the upper side using the wireless I/F 1121 of the plurality of hybrid slave units 11 is limited by the above-mentioned processing, communication traffic on a side of the wireless communication can be reduced, and a communication error by packet collision or the like can be suppressed.

Here, even if the channel on the upper side of the hybrid slave unit 11 is formed by the wireless I/F 1121 with the adoption of the selection criterion described above, when the link cost of the channel on the lower side of the hybrid slave unit 11 is large, communication quality of the adjacent node may not be secured. Therefore, it is preferable to also evaluate the link cost between the focused hybrid slave unit 11 and the adjacent node in addition to the upper route cost of the adjacent node of the focused hybrid slave unit 11.

Hereinafter, an example of operation will be described using, as an example, a communication network shown in FIG. 10. In the communication network shown in FIG. 10, if the slave unit 10 of "N12" is the focused hybrid slave unit 11, the slave units 10 of "N11", "N13", "N21", and "N22" become the adjacent nodes that perform the power line carrier communication with the focused hybrid slave unit 11. As shown in FIG. 11, the second node table (the second link table) 1112 in this focused hybrid slave unit 11 includes the same items as the example shown in FIG. 4B. However, the specific example is shown in the link costs by power line carrier communication between the focused hybrid slave unit 11 and the adjacent nodes.

According to the second node table 1112 shown in FIG. 11, the upper route costs as to the hybrid slave units 11 of "N11" and "N13", which are the adjacent nodes, are 11 and 9, respectively. The minimum value of the route cost of the focused hybrid slave unit 11 (the hybrid slave unit 11 of "N12") is 15. Therefore, in the case of the selection criterion described above, the wireless I/F 1121 is not made to be selected in this focused hybrid slave unit 11. That is, since the minimum value of the route costs of the hybrid slave units 11 of "N11" and "N13" is smaller than the minimum value of the upper route cost of the hybrid slave unit 11 of "N12" that is the adjacent node, the hybrid slave unit 11 of "N12" selects the power-line I/F 1122. On the other hand, here, the link costs of the focused hybrid slave unit 11 (the hybrid slave unit 11 of "N12") and the adjacent node are considered together. Therefore, the wireless I/F 1121 is made to be selected by the hybrid slave unit 11 of "N12".

Figure 10:
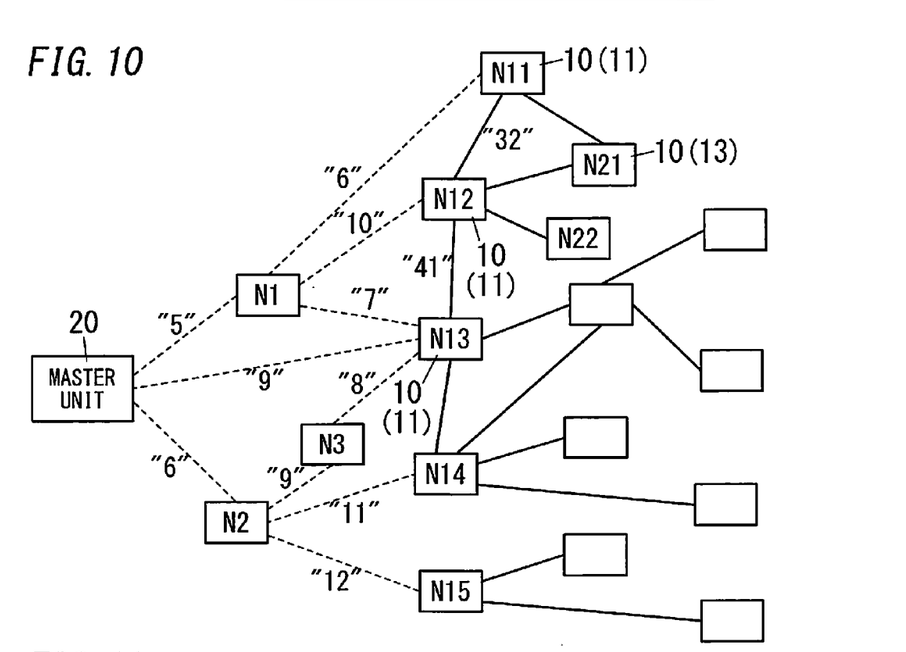
FIG. 10 is a drawing illustrating another example of the communication network according to the embodiment.
Figure 11:
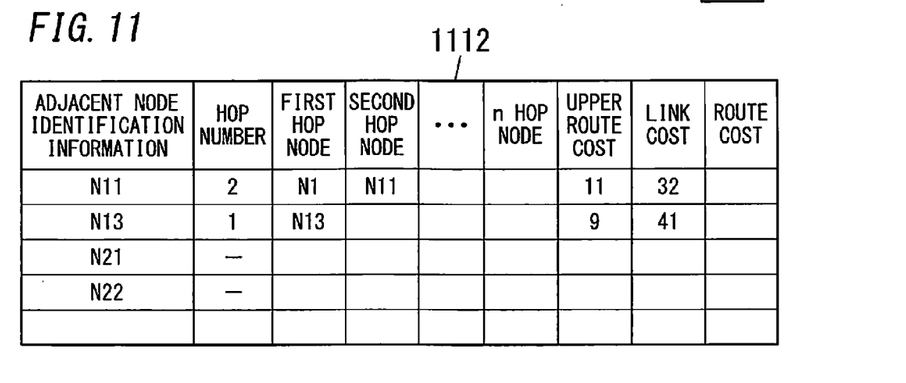
FIG. 11 is a drawing illustrating yet another example of the second link table used to the embodiment.

That is, in the example shown in FIG. 10, the link cost between the hybrid slave unit 11 of "N12" and the hybrid slave unit 11 of "N11" that is the adjacent node is 32, and the link cost between the hybrid slave unit 11 of "N12" and the hybrid slave unit 11 of "N13" that is the adjacent node is 41. Therefore, when the hybrid slave unit 11 of "N12" uses the wireless I/F 1121 for communication of the upper side, the route cost is 15. On the other hand, the route cost of the route of passing through the adjacent nodes of "N11" is 43, and the route cost of the route of passing through the adjacent node is 50, and these route costs are much increased. Therefore, in the case of the selection criterion described above when such a condition is satisfied, even if the hybrid slave unit 11 uses the power-line I/F 1122 for the communication of the upper side, it is desirable to use the wireless I/F 1121. In FIG. 10, the link costs are values enclosed in double quote near the links.

The selection processing part 1103 compares the minimum route cost (the first route cost), which is obtained from the first node table 1111, with the route cost (the second route cost), which is the sum of the upper route cost and the link cost obtained from the second node table 1112. Then, when the difference, which is obtained by subtracting the first route cost from the second route cost, exceeds a specified threshold, the selection processing part 1103 selects the wireless I/F 1121. By adding the above restriction, a possibility that the route having dramatically low communication quality is formed is reduced.

In the channel that serves as the link in the communication network formed between the master unit 20 and the slave unit 10, the wireless communication or the power line carrier communication is used by the selection criterion and the restriction described above. Incidentally, as described above, the slave unit 10 is configured to communicate with the apparatus that a consumer uses and then uses wireless communication or power line carrier communication with the apparatus. Therefore, the communication between the slave unit 10 and the apparatus may interfere with the communication between the slave unit 10 and the master unit 20.

Then, in order to decrease this kind of interference, it is preferable to use preferentially, for the communication between the slave unit 10 and the master unit 20, a transmission media different from a transmission media used for the communication between the slave unit 10 and the apparatus. For example, if the wireless communication is performed between the slave unit 10 and the apparatus in a consumer facility, it is preferable that the power line carrier communication is preferentially used for the communication between this slave unit 10 and the master unit 20.

In order to select the transmission medium of the channel between the slave unit 10 and the master unit 20 as described above, after selecting the transmission medium of the channel between the slave unit 10 and the apparatus, the slave unit 10 should select a transmission medium different from a transmission medium previously selected in the selectable range. Further, if a weighting is performed in the selection criterion so that the selected transmission medium is used preferentially, it is easy to separate the channel between the slave unit 10 and the apparatus with the channel between the slave unit 10 and the master unit 20. Thus, if the channels are separated clearly, an increase in traffic is suppressed and packet collision is also suppressed. The technique about the weighting is described later.

Incidentally, the link costs of the links included in the communication network dynamically changes depending on transmission and reception of the H packets. In the case of power line carrier communication, SNR changes depending on changes of an impedance and a noise that are generated according to operating states, on/off of switches and the like of electrical apparatuses such as electrical household appliances and electrical equipment. In the case of the wireless communication, even if the master unit 20 and the slave unit 10 do not move themselves, received signal strength changes depending to change of peripheral environment, such as movement of cars or people. However, if the route is changed by much slight change, it is not preferable on an operation management because the pattern of route diverges without converging in the whole system. Therefore, it is preferable to use the links without changing the links if the link costs do not change substantially after the links are formed once according to characteristics of power line carrier communication and wireless communication.

From this, preferably, the hybrid slave unit 11 sends out the H packet that includes the flag showing use of wireless communication for the channel on the upper side after determining using wireless communication for the channel on the upper side. The hybrid slave unit 11 that is the adjacent node and received this H packet performs a weighting in the selection criterion of the channel so that wireless communication is preferentially used in the hybrid slave unit 11 that sets up the flag. That is, the weighting is performed to the selection criterion of the channel so that wireless communication is easy to be selected as it is when the hybrid slave unit 11 has already adopted wireless communication for the channel.

In an example of the weighing, when the selection criterion for comparing the route cost with the upper route cost is used, the route cost of the hybrid slave unit 11 that sets up the flag should be reduced by a prescribed value. When the number of the adjacent nodes is used to the selection criterion, the number included in the H packet sent out from the hybrid slave unit 11 in which wireless communication is selected should be added by a prescribed number.

As described above, in the hybrid slave unit 11, when wireless communication for the channel on the upper side is once selected, the state is maintained as much as possible. Therefore, the hybrid slave unit 11 that uses wireless communication can be prevented from changing frequently.

Preferably, the hybrid slave unit 11 is configured to set up the selection criterion so that a probability that different communication methods are selected is higher than a probability that the same communication methods are selected when selecting the communication method used for the channel on the upper side, and the communication method used for the channel on the lower side.

Although the present invention has been described with reference to a certain preferred embodiment, numerous modifications and variations can be made by those skilled in the art without departing from the true spirit and scope of this invention, namely claims.

The invention claimed is:

1. A multi-hop communication system comprising a master unit and a plurality of slave units, the multi-hop communication system being configured to permit, when information is transmitted between the master unit and a slave unit of the plurality of slave units, at least another slave unit of the plurality of slave units to relay communication,
wherein the plurality of slave units comprises a plurality of hybrid slave units configured to select at least one of a plurality of communication methods that have arrival ranges of information different from each other,
wherein each of the plurality of hybrid slave units is configured to select at least one of a first communication method and a second communication method as the plurality of communication methods,
the first communication method being wireless communication by a radio wave as a transmission medium,
the second communication method being power line carrier communication by a power line as a transmission medium,
wherein each of the plurality of hybrid slave units comprises a selection processing part in which a selection criterion is predetermined,
the selection processing part, which is included in one hybrid slave unit of the plurality of hybrid slave units, being configured to select, in a case of selecting a communication method for a channel on an upper side that is a side of the master unit, the first communication method only when relationship with another hybrid slave unit of the plurality of hybrid slave units, in which a hop number in power line carrier communication between the one hybrid slave unit and the other hybrid slave unit is one, meets the selection criterion, and otherwise select the second communication method.

2. The multi-hop communication system according to claim 1,
wherein the selection processing part comprises:
a function for reporting a minimum route cost in a case of using the first communication method for the channel on the upper side, to the other hybrid slave unit in which the hop number in the power line carrier communication between the one hybrid slave unit and the other hybrid slave unit is one; and
a function for adopting the second communication method for the channel on the upper side when a route cost reported by the other hybrid slave unit is smaller than the minimum route cost of the one hybrid slave unit, and adopting the first communication method for the channel on the upper side when the route cost reported by the other hybrid slave unit is larger than the minimum route cost of the one hybrid slave unit.

3. The multi-hop communication system according to claim 2, wherein the selection processing part is configured to determine, as the route cost, a temporary route cost calculated using only receiving quality by wireless communication.

4. The multi-hop communication system according to claim 1,
wherein the selection processing part comprises:
a function for reporting, to the other hybrid slave unit in which the hop number in the power line carrier communication between the one hybrid slave unit and the other hybrid slave unit is one, a number of another slave unit in which a hop number in power line carrier communication between the one hybrid slave unit and the other slave unit is one; and
a function for adopting the first communication method for the channel on the upper side when a number reported by the other hybrid slave unit is less than the number of the other slave unit reported to the other hybrid slave unit.

5. The multi-hop communication system according to claim 1, wherein the selection processing part comprises a function for adopting the first communication method for the channel on the upper side when a slave unit of other slave units, in which hop numbers in power line carrier communication between the one hybrid slave unit and the other slave units are one, performs power line carrier communication with only the one hybrid slave unit.

6. The multi-hop communication system according to claim 2, wherein the selection processing part comprises a function for determining, as a first route cost, a minimum route cost when the first communication method is used for the channel on the upper side, and determining, as a second route cost, a route cost of passing through another slave unit in which a hop number in power line carrier communication between the one hybrid slave unit and the other slave unit is one, and adopting the first communication method for the channel on the upper side when a difference obtained by subtracting the first route cost from the second route cost exceeds a specified threshold.

7. The multi-hop communication system according to claim 1, wherein the selection processing part comprises a function for performing weighting to the selection criterion so that the first communication method is preferentially selected when the first communication method has been already adopted for the channel on the upper side, and wireless communication is preferentially used in the other hybrid slave unit when the other hybrid slave unit in which the hop number in the power line carrier communication between the one hybrid slave unit and the other hybrid slave unit is one, has been already selected wireless communication in a channel on an upper side.

8. The multi-hop communication system according to claim 1,
wherein the one hybrid slave unit comprises a function for communicating with another apparatus, and
wherein the selection processing part is configured to set so that a probability that different communication methods are selected is higher than a probability that same communication methods are selected when selecting a communication method for communication between the one hybrid slave unit and another slave unit in which a hop number in power line carrier communication between the one hybrid slave unit and the other slave unit is one, and a communication method for communication between the other apparatus and the one hybrid slave unit.

9. A slave unit used, as any one of a plurality of slave units, for a multi-hop communication system comprising a master unit and the plurality of slave units, the multi-hop communication system being configured to permit, when information is transmitted between the master unit and one slave unit of the plurality of slave units, at least another slave unit of the plurality of slave units to relay communication,
wherein the slave unit is configured to select at least one of a plurality of communication methods that have arrival ranges of information different from each other, wherein the slave unit is configured to select at least one of a first communication method and a second communication method as the plurality of communication methods, the first communication method being wireless communication by a radio wave as a transmission medium, the second communication method being power line carrier communication by a power line as a transmission medium, wherein the slave unit comprises a selection processing part in which a selection criterion is predetermined, the selection processing part being configured to select, in a case of selecting a communication method for a channel on an upper side that is a side of the master unit, the first communication method only when relationship with another slave unit of the plurality of slave units, in which a hop number in power line carrier communication between the slave unit and the other slave unit is one, meets the selection criterion, and otherwise select the second communication method.

10. The multi-hop communication system according to claim 3, wherein the selection processing part comprises a function for determining, as a first route cost, the minimum route cost when the first communication method is used for the channel on the upper side, and determining, as a second route cost, a route cost of passing through another slave unit in which a hop number in power line carrier communication between the one hybrid slave unit and the other slave unit is one, and adopting the first communication method for the channel on the upper side when a difference obtained by subtracting the first route cost from the second route cost exceeds a specified threshold.

11. The multi-hop communication system according to claim 4, wherein the selection processing part comprises a function for determining, as a first route cost, the minimum route cost when the first communication method is used for the channel on the upper side, and determining, as a second route cost, a route cost of passing through another slave unit in which a hop number in power line carrier communication between the one hybrid slave unit and the other slave unit is one, and adopting the first communication method for the channel on the upper side when a difference obtained by subtracting the first route cost from the second route cost exceeds a specified threshold.

12. The multi-hop communication system according to claim 5, wherein the selection processing part comprises a function for determining, as a first route cost, the minimum route cost when the first communication method is used for the channel on the upper side, and determining, as a second route cost, a route cost of passing through another slave unit in which a hop number in power line carrier communication between the one hybrid slave unit and the other slave unit is one, and adopting the first communication method for the channel on the upper side when a difference obtained by subtracting the first route cost from the second route cost exceeds a specified threshold.

13. The multi-hop communication system according to claim 2, wherein the selection processing part comprises a function for performing weighting to the selection criterion so that the first communication method is preferentially selected when the first communication method has been already adopted for the channel on the upper side, and wireless communication is preferentially used in the other hybrid slave unit when the other hybrid slave unit in which the hop number in the power line carrier communication between the one hybrid slave unit and the other hybrid slave unit is one, has been already selected wireless communication in a channel on an upper side.

14. The multi-hop communication system according to claim 4, wherein the selection processing part comprises a function for performing weighting to the selection criterion so that the first communication method is preferentially selected when the first communication method has been already adopted for the channel on the upper side, and wireless communication is preferentially used in the other hybrid slave unit when the other hybrid slave unit in which the hop number in the power line carrier communication between the one hybrid slave unit and the other hybrid slave unit is one, has been already selected wireless communication in a channel on an upper side.

15. The multi-hop communication system according to claim 5, wherein the selection processing part comprises a function for performing weighting to the selection criterion so that the first communication method is preferentially selected when the first communication method has been already adopted for the channel on the upper side, and wireless communication is preferentially used in the other hybrid slave unit when the other hybrid slave unit in which the hop number in the power line carrier communication between the one hybrid slave unit and the other hybrid slave unit is one, has been already selected wireless communication in a channel on an upper side.

16. The multi-hop communication system according to claim 2,
wherein the one hybrid slave unit comprises a function for communicating with another apparatus, and
wherein the selection processing part is configured to set so that a probability that different communication methods are selected is higher than a probability that same communication methods are selected when selecting a communication method for communication between the one hybrid slave unit and another slave unit in which a hop number in power line carrier communication between the one hybrid slave unit and the other slave unit is one, and a communication method for communication between the other apparatus and the one hybrid slave unit.

17. The multi-hop communication system according to claim 4,
wherein the one hybrid slave unit comprises a function for communicating with another apparatus, and
wherein the selection processing part is configured to set so that a probability that different communication methods are selected is higher than a probability that same communication methods are selected when selecting a communication method for communication between the one hybrid slave unit and another slave unit in which a hop number in power line carrier communication between the one hybrid slave unit and the other slave unit is one, and a communication method for communication between the other apparatus and the one hybrid slave unit.

18. The multi-hop communication system according to claim 5,
wherein the one hybrid slave unit comprises a function for communicating with another apparatus, and
wherein the selection processing part is configured to set so that a probability that different communication methods are selected is higher than a probability that same communication methods are selected when selecting a communication method for communication between the one hybrid slave unit and another slave unit in which a hop number in power line carrier communication between the one hybrid slave unit and the other slave unit is one, and a communication method for communication between the other apparatus and the one hybrid slave unit.

19. A multi-hop communication system comprising a master unit and a plurality of slave units as nodes, the multi-hop communication system being configured to permit, when information is transmitted between the master unit and a slave unit of the plurality of slave units, at least another slave unit of the plurality of slave units to relay communication, wherein the plurality of slave units comprises a hybrid slave unit configured to select at least one of wireless communication by a radio wave as a transmission medium, and power line carrier communication by a power line as a transmission medium, and wherein the hybrid slave unit comprises a route construction part, the route construction part being configured to perform preprocessing for determining which the power line carrier communication or the wireless communication is used between the hybrid slave unit and another node of the nodes, which is adjacent to the hybrid slave unit, and then perform main processing for calculating a route cost between the master unit and the hybrid slave unit to construct a route between the hybrid slave unit and the other node, a hop number in power line carrier communication between the hybrid slave unit and the other node being one.

* * * * *